3,062,005
COORDINATED VARIABLE AREA NOZZLE AND REHEAT FUEL CONTROL FOR A GAS TURBINE ENGINE
David Omri Davies, Kingsway, Derby, and Hugh Francis Cantwell, Bingham, England, assignors to Rolls-Royce Limited, Derby, England, a British company
Filed Aug. 8, 1960, Ser. No. 48,250
Claims priority, application Great Britain Aug. 26, 1959
5 Claims. (Cl. 60—35.6)

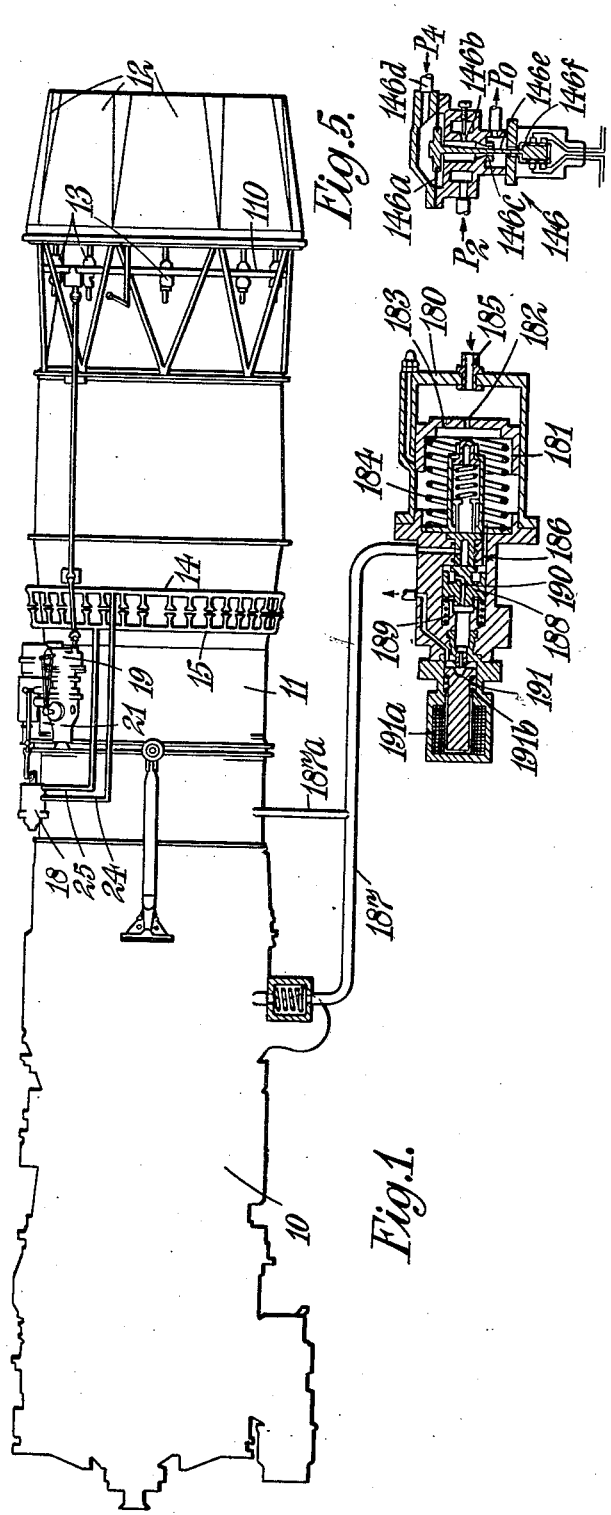

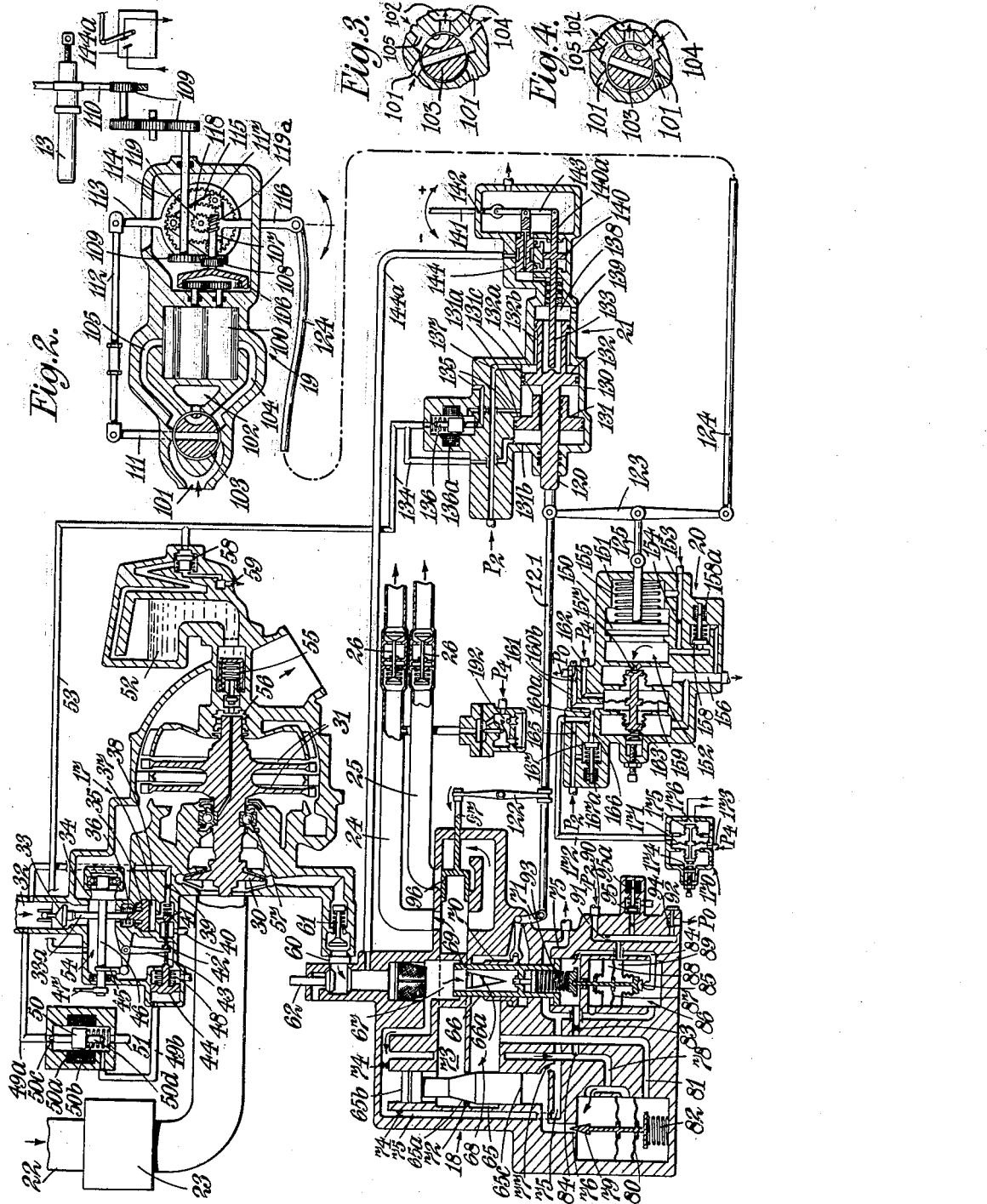

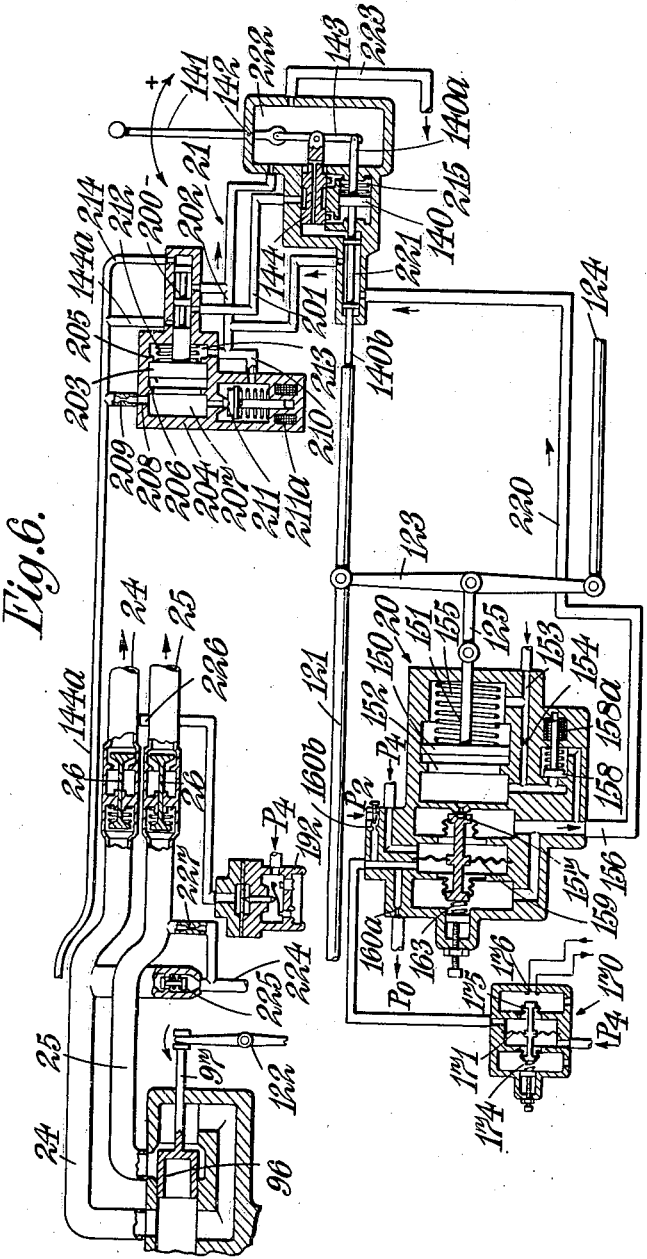

This invention comprises improvements in or relating to gas turbine engines and, more particularly, is concerned with gas-turbine jet engines having reheat combustion equipment. A gas turbine jet engine comprises a compressor, main combustion equipment, a turbine and a jet pipe connected in flow series arrangement and the reheat combustion equipment is fitted in the jet pipe.

According to the present invention, a gas turbine engine having a jet pipe fitted with reheat combustion equipment and an adjustable area propulsion nozzle, comprising reheat fuel scheduling means which determines the rate of fuel supply to the reheat combustion equipment, reheat control means including a member settable in accordance with the desired degree of reheat and arranged on being set to effect adjustment of the fuel scheduling means and of the nozzle area, and nozzle area trimming means adapted to respond to a selected value of the ratio of the compressor delivery pressure ($P_2$) to the jet pipe pressure ($P_4$) and to adjust the nozzle area in a manner to maintain the selected value of the ratio ($P_2/P_4$).

Preferably, the settable member is connected to the fuel scheduling unit and to a motor unit for adjusting the nozzle area by a mechanical linkage, and the nozzle area trimming unit is connected to the motor unit through the same linkage but in a manner such that it does not affect the fuel scheduling unit.

When the reheat combustion equipment comprises both pilot fuel injectors and main fuel injectors fed through separate fuel pipes from the fuel scheduling unit, the settable member may, for instance through the mechanical linkage, also operate a valve controlling the flow of fuel from the scheduling unit into the main fuel pipe so as gradually to open the valve on increase of the selected degree of reheat.

According to a feature of this invention, the fuel scheduling unit and the nozzle area trimming unit may each include pre-settable means which is rendered operative for take-off operation of the engine to enable the engine to operate at a higher value of the pressure ($P_4$) and at a lower value of the ratio $P_2/P_4$ than during flight operation. Preferably it as arranged that the nozzle area trimming unit is inoperative during flight without reheat and reheat lightup, but is operative during take-off without reheat so as to permit operation of the engine at a higher value of the pressure $P_4$ and lower value of the ratio $P_2/P_4$ than in flight without reheat.

According to another preferred feature of this invention, the nozzle area trimming unit has a limited trimming potential and is arranged on being rendered inoperative, during flight without reheat and during reheat light-up, to be set at the maximum area end of its range of area adjustment.

One form of gas turbine engine and forms of its reheat fuel system will now be described with reference to the accompanying drawings in which:

FIGURE 1 shows the engine;

FIGURE 2 shows the reheat fuel system and nozzle area control;

FIGURES 3 and 4 show positions of adjustment of a part of FIGURE 2,

FIGURE 5 shows a detail; and

FIGURE 6 illustrates modifications of parts of the controls shown in FIGURE 2.

The engine 10 (FIGURE 1) is of a conventional kind comprising a compressor, main combustion equipment and a turbine in flow series, the turbine driving the compressor, and is shown in outline. Exhaust gases from the turbine flow into a jet pipe 11 having at its outlet end a variable area nozzle, whereof the area varying elements 12 are adjusted by screw jacks 13. The jet pipe 11 houses reheat combustion equipment in the form of pilot and main fuel injectors fed from pilot and main manifolds 14, 15 respectively, the fuel supply being under control of a reheat fuel system which is coupled to a selector mechanism which not only selectes the rate of fuel flow but also the basic setting of the nozzle area as determined by the elements 12.

The reheat fuel system (FIGURE 2) comprises a fuel pump unit 17 wherein the rate of fuel supply is approximately scheduled and a fuel scheduling unit 18 wherein the rate of fuel flow is controlled in accordance with a degree of reheat selected by the pilot and in accordance with the compressor delivery pressure ($P_2$). The nozzle operating jacks 13 are controlled by a motor unit 19 which is operated in accordance with the selected degree of reheat and by an area trimming unit 20 which operates to adjust the nozzle area to maintain a selected ratio of the compressor delivery pressure ($P_2$) and the jet pipe pressure ($P_4$). The degree of reheat signal applied to the units 18, 19 is derived from a reheat control unit 21.

The reheat fuel is drawn by pump unit 17 from a storage tank through pipe 22 containing a filter and low-pressure shut-off cock 23 and is delivered by the pump through the scheduling unit 18 to pilot fuel line 24 and main fuel line 25, each of which contains a non-return valve 26, and which lead to the manifolds 14, 15 respectively.

The pump unit 17 comprises a centrifugal fuel pump 30 driven by an air turbine 31 which is supplied through conduit 32 with air tapped from the delivery of the engine compressor. The air supply is under control of two valves 33, 34.

Valve 33 has a stem 33a connecting it to a piston 35, which is loaded in the sense of closing the valve 33 by a spring 36 and in the sense of opening the valve 33 by air pressure in a space 37. Space 37 is connected to conduit 32 by duct 38 containing a restrictor 39 and the space 37 also has an outlet 40 to atmosphere which is controlled by a spring-loaded valve 41. When valve 41 is closed the pressure in space 37 is compressor delivery pressure and the piston 35 is in the position shown in which valve 33 is open; when valve 41 is open the pressure in space 37 is substantially atmospheric and piston 35 is moved downwards by spring 36 to close valve 33. Valve 41 is moved to its open position by a tappet 42 which is operated either by a bell-crank lever 43 or by a piston 44. Lever 43 is rocked by a cam 45 carried by a shaft 46 rotatable by arm 47 which is under control of the pilot's reheat selection lever. When reheat is selected, lever 43 is rocked to move the tappet 42 clear of the valve 41 so allowing it to close. Piston 44 is operated under emergency shut down conditions and is supplied with pressure fluid to move it against a spring 48 thereby to open valve 41; the pressure fluid is air tapped from conduit 32 by ducts 49a, 49b joined through a solenoid controlled valve 50. When the solenoid 50a is de-energised, the valve 50 is urged upwardly by spring 50b and valve stem 50c closes off the outlet end of duct 49a and valve stem 50d opens up an outlet 51 to atmosphere so that the piston 44 is subjected to atmospheric pressure and is urged to the left by spring 48. On energisation of the solenoid 50a, the ducts 49a, 49b are interconnected and outlet 51 is closed so that pressure air reaches piston 44 and moves it to the right to open valve 41, thus allowing valve 33 to be closed; this operation can be effected even though lever 47 is in a reheat selected position.

Valve 34 is a rotary valve and it is mounted on the shaft 46 to be rotated by the lever 47. Valve 34 meters the air supply to the air turbine 31 and thus determines the rotational speed of the turbine and of the pump 30 so roughly scheduling the fuel supply to the reheat combustion equipment. As the degree of reheat required is increased so valve 34 is opened and under maximum reheat conditions the valve 34 is fully open.

The air turbine 31 has a lubricating system which is operative when the turbine is running. The system comprises a reservoir 52 which is connected by a duct 53 to a space 54 between the valves 33, 34 thereby to be pressurised when valve 33 is opened. Oil is thus delivered from the reservoir past a spring loaded piston valve 55 to a duct 56 in the turbine rotor leading to bearing 57. When pressure air enters duct 53, it displaces spring-loaded valve 58 so connecting the duct with the reservoir 52 and cutting off the reservoir from an atmospheric air connection 59; when duct 53 is cut off from its supply of pressure air the valve 58 moves to connect reservoir 52 with the atmospheric connection 59.

The fuel pump 30 delivers fuel through pipe 60, containing a non-return valve 61 and a fuel pressure test valve 62, to the fuel scheduling unit 18. This unit may be of any convenient form, but is shown as comprising a throttle valve 65 and a metering valve 66, the throttle valve 65 maintaining a constant pressure drop across the metering valve 66. The metering valve 66 is of the slide valve type and has a triangular port 66a leading from the inlet chamber 67 to an intermediate chamber 68. The operative area of the port 66a is determined by the position of the port 66a relative to a wall 69 of the unit 18 and to a sleeve 70 surrounding the valve 66 and movable lengthwise of it by a lever 71 which is set by the reheat control unit 21. It will be clear that, for a given pressure drop across the valve 66, upward movement of the valve 66 or of the sleeve 70 will reduce the reheat fuel supply and downward movement of the valve 66 or sleeve 70 will increase the reheat fuel supply.

The throttle valve 65 has a shaped portion 65a co-operating with an orifice 72 connecting the chamber 68 with an outlet chamber 73; downward movement of the throttle valve 65 increases the orifice area and thus decreases the pressure in chamber 68 and, conversely, upward movement of the valve 65 decreases the orifice area and so increases the fuel pressure in chamber 68. The ends 65b, 65c of the throttle valve are formed as opposed pistons, the piston 65b being subjected to the pressure between a pair of restrictors 74 in a duct 75 leading from the inlet chamber 67 to a low pressure point in the fuel system, and the piston 65c being subjected to the pressure between a variable restriction 76 and a fixed restrictor 77 in a duct 78 leading from the inlet chamber 67 to the low pressure fuel point. As the area of restriction 76 is decreased by a valve element 79, the pressure to which piston 65c is subjected decreases and the throttle valve moves downwards to decrease the pressure in chamber 68, and as the area of restriction 76 is increased, the pressure on piston 65c increases and the throttle valve 65 moves upwards to increase the pressure in chamber 68.

The valve element 79 is controlled by the pressure drop from inlet chamber 67 to chamber 68 and for this purpose is connected to a flexible diaphragm 80 which is loaded on its upper surface by the pressure in chamber 67, via duct 78, and on its lower surface by the pressure in chamber 68, via a duct 81, and by a spring 82 so that the spring 82 determines the basic controlled value of the pressure drop. If the pressure drop falls, valve element 79 is moved to decrease the area of restriction 76 so causing a decrease of pressure in chamber 68 restoring the desired pressure drop, and conversely if the pressure drop increases the valve element 79 is moved to increase the area of the restriction 76 causing an increase in the pressure in chamber 68 to restore the desired pressure drop.

The position of the slide valve 66 is controlled in accordance with the compressor delivery pressure ($P_2$). As will be seen the slide valve has an internal wall so that it acts as a piston, the upper side of which is subjected to the fuel pressure in chamber 67 and the lower side of which is of larger area and is subjected to a fuel pressure dependent on the pressure ($P_2$). This second fuel pressure is derived from between a fixed restrictor 83 which is in a duct 84 leading from duct 78, and a half ball type bleed valve 85 provided at the outlet of duct 84 which opens into a chamber 86 connected with the low-pressure fuel point. The bleed valve 85 is carried by a flexible diaphragm 87 separating an evacuated chamber 88 and a chamber 89 containing air at a pressure which is dependent on the pressure $P_2$ and is derived from between a fixed restrictor 91 and a presettable restrictor 92 in a conduit 90, one end of conduit 90 being connected to the compressor delivery and the other end to atmospheric pressure. The diaphragm 87 is also loaded by a spring 93 in accordance with the position of the metering valve 66.

In operation, on increase of the pressure $P_2$, diaphragm 87 is displaced to open bleed valve 85 so causing a decrease in the fuel pressure acting on the larger area side of the valve 66 which therefore moves downwardly increasing the area of port 66a and at the same time increasing the load of the spring 93 on the diaphragm 87 therefore gradually closing down the bleed valve 85 and this movement continues until a balanced position of the valves 66 and 85 is reached in which the load of spring 93 balances the $P_2$ load and the fluid loads on the valve 66 are balanced. On decrease of the value of pressure $P_2$, diaphragm 87 moves downwards to close the bleed valve 85 so increasing the pressure to which the larger area side of valve 66 is subjected causing it to move upwards to decrease the area of port 66a and thus the fuel delivery, this movement continuing until balanced positions of the valves 66, 85 are reached.

Thus the fuel scheduling unit operates accurately to determine the rate of fuel delivery to the reheat combustion equipment by maintaining a constant pressure drop across a metering orifice 66a the area of which is controlled in accordance with the compressor delivery pressure $P_2$ and in accordance with the selected degree of reheat.

For take-off purposes, it is desirable to operate at a higher pressure ($P_4$) in the jet pipe and to enable this condition to be obtained a lower value of $P_2$ is simulated in the scheduling unit by opening an extra outlet to atmosphere from between the restrictors 91, 92. This outlet contains a further restrictor 94 flow through which is controlled by a solenoid-operated valve 95. The solenoid of valve 95 is energised for take-off so opening valve 95 and reducing the pressure to which the diaphragm 87 is subjected. Thus the fuel supply to the reheat equipment for any given value of the pressure $P_2$ is controlled during take-off to be lower than during flight reheat operation so permitting a higher value of the jet pipe pressure ($P_4$) for take-off.

The solenoid 95a of the valve 95 is connected in a circuit containing switches which prevent energisation at engine rotational speeds less than a selected value and which effect de-energisation after take-off is completed for example by raising the aircraft undercarriage.

The fuel from chamber 73 flows to the fuel pipes 24, 25. At low reheat settings, fuel passes only to the pilot fuel pipe 24 and as the degree of reheat setting is increased the entry of fuel to the main fuel pipe 25 is increased by opening a valve 96 which is moved by a member 97 actuated by the reheat control unit 21.

The motor unit 19 for operating the screw jacks 13 comprises a reversible air motor 100 which is supplied with pressure air through port 101 and has an exhaust port 102. The incoming and outgoing air is controlled by a valve 103 which is constructed so as to have a neutral position (FIGURE 2) in which no air reaches the motor 100, a nozzle-opening position (FIGURE 3) in which air is fed to duct 104 and exhausts through duct 105, and a nozzle-closing position (FIGURE 4) in which air is fed to duct 105 and and exhausts through duct 104. The motor 100 drives an annulus gear 106 having a shaft 107 which carries a spur gear 108 connected by a train of gears 109 to drive a ring gear 110 by which all the screw jacks 13 are operated simultaneously.

The valve 103 is rotated by an arm 111 which is connected by a link 112 to an arm 113 projecting from an annulus gear 114. The annulus gear 114 can be rotated under control of the reheat control unit 21 and under control of the air motor 100. For this purpose, there is provided a planet carrier 115 which is rotatable by an arm 116 under control of unit 21 and also of the nozzle area trimming unit 20 and which carries a series of planets 117 meshing with both the annulus gear 114 and a sun gear 118, the sun gear 118 being rotatable with a worm wheel 119 meshing with a worm 119a carried by the shaft 107. On angular movement of the arm 116, annulus gear 114 is rotated by the planets 117 running around the sun gear 118, so moving the arm 111 to adjust valve 103 to admit air to the motor 100. The resulting rotation of the motor 100 not only causes adjustment of the screw jacks 13, but also drives the sun gear 118 and through the planets 117 causes reverse rotation of the annulus gear 114 so gradually returning the valve 103 to its neutral setting. Thus for each position of arm 116 there is a corresponding setting of the jacks 13 and thus a corresponding nozzle area.

As will be clear from the foregoing description, the sleeve 70 of the fuel scheduling unit 18, the valve 96 and the arm 116 of the motor unit are adjusted by the reheat control unit 21, and these parts are interconnected by a mechanical linkage so that the adjustments are simultaneous and each dependent on the degree of reheat selected. The linkage is also such that a trimming action can be applied to the nozzle by the unit 20.

The reheat control unit comprises a piston rod 120 the position of which is determined in accordance with the selected degree of reheat when the reheat system is operative, or which is set in a position suitable for non-reheat operation. The rod 120 is connected by a link 121 with the lever 71 to rock it and the link 121 also operates a lever 122 for actuating valve 96 through member 97 and rocks a floating lever 123. The lever 123 has one end pivoted to the link 121, has its opposite end pivoted to a link 124 connecting the lever with the arm 116, and is pivoted between its ends to a piston rod 125 of the unit 20. Clearly, if rod 125 is fixed and rod 120 is moved, the levers 71, 122 and 123 are rocked to adjust the parts 70, 96 and 116. Alternatively, if rod 120 is stationary and rod 125 is moved, the arm 116 only is adjusted, the lever 123 pivoting about its connection with link 121.

The reheat control unit 21 is in the form of a servo mechanism and comprises a cylinder 130 housing two pistons 131, 132 of which piston 131 has a limited travel between abutments 131a, 131b. The piston 132 has the rod 120 secured to it and has its movement limited by the stop 131c on the piston 131 and by a servo-operated abutment 133. Each piston is of the differential area kind, the right hand side being of less area than the left hand side. The left hand side of the piston 131 is fed with air by pipes 134 and 53 to be at the pressure prevailing in space 54 of the pump unit 17. The space between the pistons 131, 132 is connected with the pipes 53, 134 or with atmosphere through duct 135 under control of solenoid-operated valve 136. The space 132a to the right of piston 132 is fed with air at the pressure $P_2$ through duct 137. A space 138 to the right of a hollow extension 132b of piston 132 is open to atmosphere through port 139.

During non-reheat operation, only space 132a is fed with pressure air and the piston 131 will be held against abutment 131b and piston 132 will be held against abutment 131c.

During reheat operation, as soon as pressure builds up in space 54 of the unit 17, piston 131 will be moved against abutment 131a and piston 132 will occupy a position against abutment 131c or against abutment 133 according to operating conditions.

The abutment 133 is carried by a servo piston 140, the position of which is determined by the setting of a lever 141 which like lever 47 of unit 17 is set by the pilot. Lever 141 is pivoted at 142 and engages one end of a lever 143 which at its opposite end is pivoted to extension 140a of piston 140 and intermediate its ends is connected to a control valve 144. Valve 144 controls a supply of reheat fuel from pipe 144a to the sides of servo piston 140. When lever 141 is rocked clockwise, lever 143 rocks about its connection with part 140a and moves the valve 144 to the left admitting fuel to the left hand side of the piston 140 which therefore moves to the right carrying with it the abutment 133 and gradually returning valve 144 to its neutral position when movement of the piston 140 will stop. Conversely anti-clockwise movement of the lever 141, results in travel to the left of the abutment 133. It will be clear that for every setting of lever 141 there is a corresponding setting of the abutment 133.

The solenoid 136a of the valve 136 is energised during the reheat light-up period and thus, during light-up, the space between the pistons 131, 132 is open to atmosphere and piston 132 is against abutment 131c, piston 131 being against the abutment 131a as shown, and thus the area of the nozzle is selected to have an area suitable for reheat light-up. When this position of the nozzle is reached, a nozzle position switch 145 is closed and closure of this switch permits supply of current to a microjet unit 146 (FIGURE 5) which inter alia causes de-energisation of solenoid 136a by sensing the sudden rise in the pressure $P_4$ in the jet pipe 11 as soon as light-up occurs. When this de-energisation of the solenoid 136a occurs, pressure air enters the space between pistons 131, 132 and piston 132 is moved to a position against the abutment 133 and thereafter the position of piston 132 is determined by the position of abutment 133 and thus of the degree of reheat selected by setting lever 141. In consequence, during reheat operation, the sleeve 70, valve 96 and the nozzle have settings corresponding to the desired degree of reheat.

During non-reheat take off operation and reheat operation of the engine, the area of the nozzle is trimmed to maintain a selected value of the ratio $P_2/P_4$, this trimming action being effected by the unit 20.

The rod 125 of the unit 20 is connected to a differential-area piston 150 separating two pressure spaces 151, 152, of which space 151 is fed with high pressure fuel through duct 153 and of which space 152 is connected to duct 153 via a restrictor 154. Space 151 also houses a spring 155 urging piston 150 to the left. Space 152 has two outlets to a low pressure fuel pipe 156, one outlet being controlled by a half-ball valve 157 and the other being controlled by a solenoid controlled valve 158.

Valve 157 is carried by a flexible diaphragm 159 which is subjected on one side to the pressure between two restrictors 160a, 160b in a duct 161 one end of which is connected to the compressor delivery to receive air at pressure $P_2$ and the opposite end of which is connected to atmospheric pressure $P_0$. The restrictor 160b is presettable. The other side of diaphragm 159 is subjected through connection 162 to the pressure $P_4$ in the jet pipe 11, and the diaphragm 159 is also loaded by a spring 163. Thus the diaphragm is responsive to a particular value of the ratio $P_2/P_4$. An unwanted increase in the value of the ratio due to an unwanted decrease in the pressure $P_4$ causes the half ball valve 157 to close so that the pressure in space 152 rises causing piston 150 to move to the right. This movement causes nozzle closing movement of the arm 116 and closing of the nozzle causes an increase in $P_4$ and restoration of the ratio $P_2/P_4$ to the selected value. Conversely, an unwanted increase in jet pipe pressure $P_4$ causes the diaphragm 159 to open valve 157 so causing piston 150 to be moved to the left adjusting arm 116 in the nozzle area increasing direction, the resulting area increase causing a fall in the pressure $P_4$ and restoration of the desired value of the ratio $P_2/P_4$.

The valve 158 is opened by energisation of its solenoid 158a and this is effected for reheat light-up and for non-reheat flight operation. Opening of valve 158 causes piston 150 to move to its extreme left hand position and therefore causes opening up of the nozzle area to the maximum extent permitted by the limited trim potential of the unit 20. Once light-up has occurred the Microjet unit 146 (FIGURE 5) causes de-energisation of the solenoid 158a and thus closure of the valve 158 to allow normal operation of the unit 20.

The unit 20 also includes a device for varying, during take-off, the value of the ratio $P_2/P_4$ to which the device responds. This device comprises parallel arranged resistors 165, 166 in the duct 161, the flow through restrictor 166 being controlled by a solenoid-operated valve 167. During take-off, the solenoid 167a of valve 167 is energized so that the pressures just upstream of restrictor 160a and to the left of diaphragm 159 rise, so that for any particular value of the pressure $P_2$, the value of the jet pipe pressure $P_4$ required to achieve balance in the unit 20 is higher than when the valve 167 is closed. In other words the unit 20 is adjusted to permit a higher value of the pressure $P_4$ or to respond to a lower value of the ratio $P_2/P_4$.

Like the solenoid 95a of the valve 95, in the unit 18, the solenoid 167a of valve 167 is in a circuit containing a switch preventing its energisation unless the engine speed exceeds a selected value, and containing also a switch, for instance an undercarriage-operated switch, which de-energises the solenoid 167a on completion of take-off.

The unit 20 has associated with it an over-rich trip switch 170 which operates to cancel reheat operation in the event that the ratio $P_2/P_4$ falls below a selected value, and like the unit 20, the switch 170 is adjusted during take-off to respond to a lower value of the ratio than in flight reheat operation. The switch 170 comprises a diaphragm 171 loaded on one surface through conduit 172 by the pressure in the duct 161 between the restrictors 165, 160a and loaded on the opposite surface through conduit 173 by the pressure $P_4$. The response of diaphragm 171 is thus varied by opening and closing of valve 167 of the unit 20. The diaphragm is also loaded by a pre-settable spring 174 and carries a switch contact 175 which, when the ratio $P_2/P_4$ falls to the selected value, bridges contacts 176 in a circuit for energising the solenoid 50a of the emergency shut-down valve 50 in the pump unit 17.

The solenoid 50a of the valve 50 is also arranged to be energised by the Microjet switch 146 when the value of the ratio $P_2/P_4$ exceeds a selected value.

The fuel system also includes ignition means for effecting light-up of the reheat fuel and in FIGURE 1 the means is shown as a device which injects extra fuel into the main combustion equipment of the engine 10 to cause a flash of flame to pass through the turbine into the jet pipe 11.

The device comprises a cylinder 180 containing a piston 181 through which extends a central hole 182 and a fine bleed hole 183. A spring 184 urges the piston to the right and high pressure fuel is fed to the right hand side of the piston through port 185. The cylinder has an outlet 186 which is connected with a fuel pipe 187 leading to the main combustion equipment under control of a piston valve 188. The valve 188 is loaded to closure by a spring 189 and is subjected in opposition to the spring to the fuel pressure in the cylinder 180. The side of the valve 188 remote from the cylinder 180 is connected through bleed 190 to be loaded by pressure fuel, the pressure of which is determined by a bleed valve 191 which is opened by energisation of a solenoid 191a. When valve 191 is held closed by a spring 191b (the solenoid 191a being de-energised) the fuel pressures acting on the piston valve 188 are equal and thus the valve 188 closes off connection between outlet 186 and the pipe 187. When solenoid 191a is energised, however, the pressure to the left of piston valve 188 falls and the valve is moved to the left so connecting outlet 186 and the pipe 187. The fuel pressure to the left of piston 181 thus falls and the piston is moved to the left delivering a metered quantity of fuel to the engine combustion equipment, and also if desired through branch 187a into the jet pipe 11.

The solenoid 191a is connected in a circuit containing a fuel-pressure operated switch 192 (FIGURE 2) which is closed only when the fuel pressure in the reheat fuel pilot pipe 24 has built up, and containing also the nozzle position switch 145 which is closed when the nozzle area is opened to a position suitable for reheat light-up. The solenoid 191a is de-energised after light-up by operation of the Microjet unit 146. On de-energisation of solenoid 191a, valve 191 closes causing piston valve 188 to move to the right cutting off pipe 187 from outlet 186 so that the pressures acting on piston 181 equalise and the piston is moved to the right by spring 184 thus resetting the ignition device for re-operation.

The Microjet unit 146 above referred to comprises a diaphragm 146a subjected on one side through conduit 146d to the pressure $P_4$ and on the opposite side to a pressure dependent on the pressure $P_2$ and derived from between two restrictors 146b, 146c, so as thereby to respond to a ratio of the pressures $P_2$, $P_4$. The diaphragm has a stem 146e carrying a movable contactor 146f having appropriate contacts for controlling the various solenoids as above described.

During normal non-reheat operation, the unit 17 is inoperative due to valve 41 being open, the unit 18 is inoperative, the reheat control unit 21 is set so that pistons 131, 132 are at the minimum nozzle area position, and unit 20 is inoperative to vary the nozzle area since solenoid 158a is energised to allow a small continuous cooling flow through the unit. However during take-off with no reheat solenoid 158a is de-energised to enable the unit 20 to operate to maintain a selected value of the ratio $P_2/P_4$.

On reheat selection by the pilot, when in flight, the following operations occur provided the engine speed is above a selected value. Valves 33, 34 of the pump unit 17 are opened by rocking of lever 47, and solenoid 136a of unit 21 is energised. Thus the piston 131 of unit 21 is moved against abutment 131a, the piston 132 being against abutment 131c, causing operation of the motor unit 19 to adjust the nozzle to area suitable for light-up. When the nozzle reaches this position switch 145 closes. Also when sufficient fuel presure has built up in pipe 24, switch 192 closes. When both of the switches 145, 192 are closed solenoid 191a of the ignition device is energised to feed extra fuel to the main combustion equipment causing a flame to pass through the turbine to light the fuel being fed to the jet pipe through pipe 187a and through the pilot injectors of the reheat combustion equipment. When light-up occurs, the pressure in the jet pipe rises so operating the Microjet unit 146 to de-energise (a) the solenoid 191a of the ignition device, (b) the solenoid 136a of the reheat control unit so permitting piston 132 to move to a position against abutment 133, and (c) the solenoid 158a so rendering the area trimming unit 20 operative. The reheat fuel supply is now controlled by the scheduling unit 18 in accordance with the pressure $P_2$ and the setting of lever 141 and the nozzle area is determined by the setting of lever 141 and by the trimming unit 20 so as to maintain a selected value of the ratio $P_2/P_4$.

If reheat is to be used during take off, the reheat system is lit up as just described for the flight condition, the solenoids 95a and 167a being de-energised; however when light-up occurs the Microjet 146 not only de-energises solenoids 191a, 136a and 158a, but also energises the solenoids 95a, 167a so altering the control effect of the units 18, 20 to enable the engine to operate at a lower value of $P_2/P_4$ than is the case in flight reheat operation. When take-off is completed the two solenoids 95a, 167a are deenergised for example by the undercarriage switches and the units 18, 20 then control to allow the engine to operate at the normal "flight with reheat" $P_2/P_4$ ratio.

Modified forms of the reheat control unit 21 and the nozzle area trim unit 20 are shown in FIGURE 6.

The modified form of the unit 21 is suitable for use when reheat "light-up" is effected with the nozzle at its normal cruise area. The unit comprises (as in FIGURE 2) a reheat selector lever 141 pivoted at 142 and moving one end of a lever 143, of which the other end is pivoted to the rod 140a of a ram piston 140 and of which an intermediate point is pivoted to a control valve 144 for controlling the supply of pressure fuel to the ram to operate it.

In this case, however, the ram piston 140 is directly connected to the link 121 by a rod 140b, the multiple piston arrangement of FIGURE 2 being omitted. As with FIGURE 2, the lever 141 sets the position of control valve 144 and as the piston 140 moves the control valve 144 is gradually returned to its neutral position. Thus the piston 140 and the link 121 have a unique setting for each setting of the reheat selector lever 141.

The supply of high pressure fuel to the sides of piston 140 from the pipe 144a includes an arrangement to prevent high pressure fuel reaching the control valve 144 and the piston 140 during the reheat light-up period. This arrangement comprises a valve 200 connected in series between the pipe 144a and a pipe 201 leading to the control valve 144, the valve 200 in the position shown allowing pressure fuel to reach pipe 201 and in a position to the left of that shown connecting pipe 201 to a pipe 202 carrying low-pressure fuel. The valve 200 is formed as an extension of a piston 203 movable in a casing 204 between stops 205, 206, the piston 204 is loaded towards stop 205 by the pressure in space 207 which is connected to pipe 144a by a branch 208 containing a restrictor 209 and which has an outlet 210 to the low pressure pipe 202 under control of a solenoid-operated valve 211. The piston 201 is loaded towards stop 206 by a spring 212 in a space 213 connected to the low-pressure fuel pipe 202 and by high pressure fuel conveyed from pipe 144a by branch 214 to the small area of the valve 200.

The solenoid 211a of the valve 211 is energised during light-up so opening valve 211 and placing the space 207 in communication with its outlet 210; thus the pressure in space 207 falls and the piston 203 moves against stop 206 to connect pipes 201, 202. When light-up occurs the Microjet switch (FIGURE 5) de-energises solenoid 211a so closing valve 211 and allowing the pressure in space 207 to build up to move piston 203 against stop 205 and thereby moving valve 200 to place pipe 144a in connection with the pipe 201 to allow high pressure fuel to reach the control valve 144. The unit 21 will now operate to adjust link 121 in accordance with the degree of reheat selected by the selector lever 141.

The piston 140 is loaded by a spring 215 so that during non-reheat operation, the piston 140 is held at the left-hand end of its travel, which position corresponds to a nozzle area suitable for cruise conditions.

There is also shown in FIGURE 6, means to maintain a small flow of fuel through the units 20, 21 during non-reheat operation for cooling purposes.

The nozzle trim unit 20 is, as above described, fed with high pressure fuel from the engine main combustion fuel supply system at 153 and during non-reheat operation a small quantity of this fuel flows through duct 153 into space 152, through valve 157 to the outlet 156. The outlet 156 is connected by pipe 220 and chamber 221 surrounding the rod 140b to pipe 202 which leads into space 222 housing the lever 143 and thence to a low-pressure fuel return line 223 leading back to the fuel tank.

A further cooling fuel flow is taken to the pilot fuel line 24. This flow is taken from the engine main fuel system at a point in it where the fuel is at a pressure which is relatively low but somewhat above fuel tank pressure. For instance, the flow may be taken from the booster pump outlet and led by pipe 224 past a lightly-loaded non-return valve 225 into the pilot fuel line 24 at a point upstream of the non-return valve 26 and this flow passes through the scheduling unit 18 back to the fuel tank.

In order to prevent any fuel that may leak past the valve 96 during operation at low degrees of reheat from reaching the main reheat burners, a tapping 226 containing a small restrictor 227 is taken from main reheat supply pipe 25 between the valve 96 and its non-return valve 26 to the low pressure fuel pipe 224 so allowing any leakage fuel to pass back to the low-pressure fuel regions.

We claim:

1. A gas turbine engine having a compressor, combustion equipment, a turbine which is connected to drive the compressor, a jet pipe, all of the aforesaid elements being connected in flow series, an adjustable area propulsion nozzle at the outlet of the jet pipe, reheat combusion equipment in said jet pipe, means supplying fuel to the reheat combustion equipment including adjustable reheat fuel scheduling means which determines the rate of fuel supply to the heat combustion equipment, reheat control means including a manual lever settable to select the desired degree of reheat, servo piston connected to adjust the reheat fuel scheduling means and the propulsion nozzle during reheat operation, a pressure liquid supply, a control valve connected to be opened by adjustment of the manual lever and controlling the supply of pressure liquid to the servo piston, said control valve being adjustable by the servo piston to closure, whereby the servo piston has a unique setting for each setting of the manual lever and adjusts the fuel scheduling means to vary the fuel supply to the reheat combustion equipment and also the propulsion nozzle to select a basic nozzle area in accordance with the setting of the settable member, and a further valve in the pressure liquid supply to the servo piston, which further valve connects the servo piston alternatively to the pressure liquid supply during reheat operation and to a low pressure point during non-reheat operation and during reheat light-up, and nozzle area trimming means responsive to a selected value of the ratio of the delivery pressure ($P_2$) of said compressor to the pressure ($P_4$) in said jet pipe and connected to adjust the propulsion nozzle to vary the nozzle area from said basic area in a manner to maintain the selected value of the ratio ($P_2/P_4$).

2. A gas turbine engine having a compressor, combustion equipment, a turbine which is connected to drive the compressor, a jet pipe, all of the aforesaid elements being connected in flow series, an adjustable area propulsion nozzle at the outlet of the jet pipe, reheat combustion equipment in said jet pipe, means supplying fuel to the reheat combustion equipment including adjustable reheat fuel scheduling means which determines the rate of fuel supply to the reheat combustion equipment, reheat control means including a member settable to select the dedesired degree of reheat and connected both to adjust the fuel scheduling means to vary the fuel supply to the reheat combustion equipment and also to adjust the propulsion nozzle to select a basic nozzle area in accordance with the setting of the settable member, and nozzle area trimming means responsive to a selected value of the ratio of the delivery pressure ($P_2$) of said compressor to the pressure ($P_4$) in said jet pipe and connected to adjust the propulsion nozzle to vary the nozzle area from said basic area in a manner to maintain the selected value of the ratio ($P_2/P_4$), said nozzle area trimming means comprising a piston connected to effect adjustment of the nozzle area, a first valve controlling the pressure on one side of said piston, pressure responsive means responsive to a selected value of the pressure ratio $P_2/P_4$ and connected to operate the first valve, and a solenoid-operated valve in parallel with the first valve and on being opened causing movement of the piston of the trimming means to the maximum area end of its range of area adjustment.

3. A gas turbine engine according to claim 2, the trimming means including a duct connected at one end to be fed with air at the compressor delivery pressure ($P_2$) and a pair of flow restrictors in series in said duct, the pressure responsive means being subjected in one sense to the pressure in said duct between the restrictors and being connected to be loaded in the opposite sense by jet pipe pressure ($P_4$), and a valve-controlled restrictor connected in parallel with the upstream flow restrictor.

4. A gas turbine engine having a compressor, combustion equipment, a turbine which is connected to drive the compressor, a jet pipe, all of the aforesaid elements being connected in flow series, an adjustable area propulsion nozzle at the outlet of the jet pipe, reheat combustion equipment in said jet pipe, means supplying fuel to the reheat combustion equipment including adjustable reheat fuel scheduling means which determines the rate of fuel supply to the reheat combustion equipment, reheat control means including a member settable to select the desired degree of reheat and connected both to adjust the fuel scheduling means to vary the fuel supply to the reheat combustion equipment and also to adjust the propulsion nozzle to select a basic nozzle area in accordance with the setting of the settable member, and nozzle area trimming means responsive to a selected value of the ratio of the delivery pressure ($P_2$) of said compressor to the pressure ($P_4$) in said jet pipe and connected to adjust the propulsion nozzle to vary the nozzle area from said basic area in a manner to maintain the selected value of the ratio ($P_2/P_4$), and means operable selectively to render the nozzle area trimming unit inoperative and to permit operation of the engine at a higher value of the pressure $P_4$ and lower value of the ratio $P_2/P_4$.

5. A gas turbine engine having a compressor, combustion equipment, a turbine which is connected to drive the compressor, a jet pipe, all of the aforesaid elements being connected in flow series, an adjustable area propulsion nozzle at the outlet of the jet pipe, reheat combustion equipment in said jet pipe, means supplying fuel to the reheat combustion equipment including adjustable reheat fuel scheduling means which determines the rate of fuel supply to the reheat combustion equipment, reheat control means including a member settable to select the desired degree of reheat and connected both to adjust the fuel scheduling means to vary the fuel supply to the reheat combustion equipment and also to adjust the propulsion nozzle to select a basic nozzle area in accordance with the setting of the settable member, and nozzle area trimming means responsive to a selected value of the ratio of the delivery pressure ($P_2$) of said compressor to the pressure ($P_4$) in said jet pipe and connected to adjust the propulsion nozzle to vary the nozzle area from said basic area in a manner to maintain the selected value of the ratio ($P_2/P_4$) and said nozzle area trimming unit being operative to effect adjustment of the nozzle through a limited range of area adjustment and including selectively operable means which, on being rendered operative, cause the area trimming unit to be set at the maximum area end of its range of area adjustment.

References Cited in the file of this patent

UNITED STATES PATENTS

| | | |
|---|---|---|
| 2,508,420 | Redding | May 23, 1950 |
| 2,640,316 | Neal | June 2, 1953 |
| 2,818,703 | Victor | Jan. 7, 1958 |
| 2,926,488 | Faught | Mar. 1, 1960 |
| 2,933,887 | Davies | Apr. 26, 1960 |
| 2,987,877 | Torell | June 13, 1961 |